United States Patent [19]

Smith

[11] 4,444,059

[45] Apr. 24, 1984

[54] OSCILLATING TUBE MASS FLOW RATE METER

[75] Inventor: James E. Smith, Boulder, Colo.

[73] Assignee: Micro Motion, Boulder, Colo.

[21] Appl. No.: 417,626

[22] Filed: Sep. 13, 1982

[51] Int. Cl.³ ............................................. G01F 1/78
[52] U.S. Cl. ................................................ 73/861.37
[58] Field of Search ......................... 73/861.37, 861.38

[56] References Cited

U.S. PATENT DOCUMENTS

| | | |
|---|---|---|
| 2,813,423 | 11/1957 | Altfillisch et al. . |
| 2,821,084 | 1/1958 | Altfillisch et al. . |
| 2,831,349 | 4/1958 | Altfillisch et al. . |
| 2,834,209 | 5/1958 | Jones et al. . |
| 2,865,201 | 12/1958 | Roth . |
| 2,877,649 | 3/1959 | Powers . |
| 2,897,672 | 8/1959 | Glasbrenner et al. . |
| 2,923,154 | 2/1960 | Powers et al. . |
| 2,934,951 | 5/1960 | Li . |
| 3,049,917 | 8/1962 | Alspach et al. . |
| 3,080,750 | 3/1963 | Wiley ................................ 73/861.37 |
| 3,132,512 | 5/1964 | Roth . |
| 3,218,851 | 11/1965 | Sipin ................................ 73/861.37 |
| 3,329,019 | 7/1967 | Sipin . |
| 3,350,936 | 11/1967 | Li . |
| 3,355,944 | 12/1967 | Sipin . |
| 3,396,579 | 8/1968 | Sourian . |
| 3,485,098 | 12/1969 | Sipin . |
| 3,927,565 | 12/1975 | Pavlin et al. . |
| 4,109,524 | 8/1978 | Smith . |
| 4,127,028 | 11/1978 | Cox et al. . |
| 4,187,721 | 2/1980 | Smith ................................ 73/861.38 |

FOREIGN PATENT DOCUMENTS 2145387 2/1973 France .

Primary Examiner—Herbert Goldstein
Attorney, Agent, or Firm—Irons & Sears

[57] ABSTRACT

A flow meter apparatus for measuring the mass flow rates of fluids passed through a cantilever mounted oscillating sensing tube where the capability of the meter to measure low mass flow rates is enhanced by using a sensing tube which has a low torsional spring constant about its longitudinal axis. Mounted parallel to this sensing tube, also in a cantilever fashion, is a second tube which has essentially identical moments of inertia and spring constants. Connecting the two tubes at their free ends is a lightweight rigid structure. The two tubes with the connecting structure can be sinusoidally driven so that when a fluid is passed through the sensing tube generated Coriolis forces torsionally deflect the connecting structure about an axis located midway between the tubes. Such torsional deflection is a function of the mass flow rate of the fluid passing through the sensing tube, and this mass flow rate can be measured by determining the time required for the second of the two tubes to pass through the mid-plane of oscillation after the first tube has passed through that plane.

14 Claims, 4 Drawing Figures

OSCILLATING TUBE MASS FLOW RATE METER

BACKGROUND OF THE INVENTION

In the art of measuring mass flow rates for flowing substances it is known that flowing a fluid through a rotating or oscillating conduit produces Coriolis forces which are perpendicular to both the velocity of the mass moving through the conduit and the angular velocity vector of the rotation or oscillation of the conduit. It is also known that the magnitude of such Coriolis forces is related to the mass flow rate as a function of the angular velocity of the conduit.

One of the major technical problems previously associated with Coriolis mass flow rate instruments was the accurate measurement of Coriolis force effects such as conduit deflection. This problem arises in part because the magnitude of the Coriolis forces for moderate mass flow rates and reasonable angular velocities may be very small, resulting in very small deflection or other effects, which necessitates the use of sensitive and accurate instrumentation. Furthermore, in order to determine the mass flow rate passing through the conduit as a function of the magnitude of the generated Coriolis forces, the magnitude of the angular velocity of the conduit must also be either accurately measured or precisely controlled.

A mechanical configuration and measurement technique which, among other advantages, avoids the need to measure or control the magnitude of the angular velocity of the conduit, and concurrently provides requisite sensitivity and accuracy of measurement of the effects caused by generated Coriolis forces is taught in U.S. Pat. No. 4,187,721. The mechanical configuration disclosed in that patent incorporates a resilient U-shaped flow tube which has no pressure sensitive joints, and is cantilever mounted at the open ends of the U-tube so as to be capable of being elastically oscillated about an axis perpendicular to the side legs of the U-tube, which axis is located near the fixed mounting and in the plane in which the U-tube lies when at rest; i.e., the mid-plane of oscillation. When a substance is flowing through the U-tube, and that tube is thus mounted, oscillation of the filled U-tube so that its free end passes through the mid-plane of oscillation, causes the generation of a Coriolis force couple which elastically deflects the yoke portion of the U-tube about an axis located in the plane of the U-tube midway between and parallel to the side legs of the U-tube. By designing the mounted U-tube so that it has a resonant frequency about the axis perpendicular to the side legs of the U-tube that is lower than the resonant frequency about the axis parallel to the side legs of the U-tube, and by then oscillating the U-tube about the axis perpendicular to the side legs of the U-tube at its resonant frequency, a mechanical situation is created whereby the forces which oppose the generated Coriolis forces are predominantly linear spring forces. The fact that the forces opposing the generated Coriolis forces are predominantly linear spring forces causes one side leg of the U-tube to pass through the mid-plane of oscillation before the other side leg does so, in a linear fashion. Occurrence of these events results in a situation where measurement of the time interval between the passage of the respective side legs through the mid-plane of oscillation provides a direct means, without regard to the angular velocity of the U-tube or other variable terms, for calculating the mass flow rate passing through the U-tube. Such time difference measurements can accurately be made by using optical sensors as disclosed in U.S. Pat. No. 4,187,721, or by using electromagnetic velocity sensors as disclosed in co-pending patent application Ser. No. 280,297 of James E. Smith, filed July 6, 1981 as a continuation-in-part of application Ser. No. 235,268 of James E. Smith filed Feb. 17, 1981, now abandoned.

Since the sensitivity of Coriolis mass flow rate instruments of the type described is primarily dependent on the magnitude of elastic deflection about the axis parallel to the side legs, and because the Coriolis force couple causing such deflections is a weak force couple, increases in sensitivity can directly be accomplished by reducing the magnitude of the opposing spring forces.

The fluid flow meters described in U.S. Pat. No. 4,187,721 and co-pending application Ser. No. 280,297 are capable of measuring mass flow rates of a very wide variety of fluids, including liquids, both Newtonian and non-Newtonian, gases and multi-phase fluids such as gas-liquid or gas-solid combinations. As the mass flow rates of the fluids being measured become very low, however, improving the sensitivity of these instruments becomes increasingly important.

An example of an application where mass flow rates are very low is when the mass flow rate of gases or multi-phase combinations are measured. Examples of multi-phase combinations include solid catalyst particles suspended in a gas, grain such as wheat transported by a gas, liquids suspended above their dew point in a gas, etc. A means for increasing the sensitivity of the flow meter instruments is to decrease the wall thickness of the U-tube, which reduces the spring forces opposing the generated Coriolis forces. The degree of reduction in the wall thickness of the U-tube that is achievable, however, is limited by pressure considerations. Thus, e.g., if the mass flow rates of high pressure gases are to be measured, the wall of the U-tube must be thick enough to contain the gas which, of course, exacerbates efforts to increase instrument sensitivity.

SUMMARY OF THE INVENTION

When low mass flow rates of highly pressurized substances such as gases or multi-phase gaseous mixtures are to be measured using U-tube Coriolis mass flow rate instruments there is a set of conflicting design requirements for the U-tube which the instrument designer must satisfy. First the U-tube must be sturdy enough to contain both the high pressures and sharp pressure surges which may occur in the fluid as it passes through the tube, and secondly this same tube must be supple enough to permit elastic deflection in response to weak Coriolis forces generated by low mass flow rates. It is not possible in all cases to select a compromise thickness and material for the tubing that will serve the desired purpose. The present invention overcomes these difficulties by changing the U-tube structure so as to eliminate the requirement for one of these two conflicting design conditions without compromise of the other design condition.

Since the generation of Coriolis forces and the elastic opposition to these forces are important functional features of the U-tube structure, critical sections of the U-tube structure are the side legs where both of these phenomena occur. The yoke portion which connects these side legs serves the purpose of transporting the substance to be measured from the input side leg to the output side leg, and therefore also provides a mechanical connection between these side legs.

In the present invention, the necessity for pressure containment within the structure of the oscillating tubular member is eliminated and transferred to an appropriately designed pressure vessel in which side legs capable of being oscillated are contained; these side legs, unlike those of a U-tube, are not connected by a yoke portion which provides for transport of fluid from one side leg to the other. The removal of the yoke portion from the U-tube is compensated for, mechanically, by a lightweight cross member, which is attached to the tubular side legs at the ends opposite those fixedly attached to the pressure vessel, so that the tubes can be synchronously oscillated about a bending axis which is perpendicular to the side legs and located near the mounting. This positioning of the cross member also allows the generated Coriolis forces to effect elastic deflection of the tubes about a torsion axis which is midway between and parallel to the tubes.

If tubes with very thin side walls are used, the encased side legs can be constructed so as to have very low torsional spring constants. Such use of thin walled tubing is feasible because the tubing no longer must contain the pressure exerted by the fluid being measured.

One of the side leg tubes is used as an inlet tube, and an exit port for the fluid is so located in the pressure vessel walls that the exiting fluid does not have to pass through the other tube in order to exit from the pressure vessel. The second tube, which is mechanically matched with, and hence serves a complementary function to, the first tube, can either be open at the free end or closed. However, whether closed or open at the free end the complementary tube must have spring constants and moments of inertia which approximate those of the first tube, or sensing tube, when fluid is passing through this sensing tube. If the mass flow rate of a gas is to be measured, then an open ended complementary tube in the pressure vessel expeditiously compensates for variations in the moments of inertia caused by the gas because the gas will diffuse through the interior of the pressure vessel and therefore fill the complementary tube.

A preferred orientation for the instrument is to have the fixed ends of the sensing and complementary tubes mounted above the free ends and to have the tubes essentially in a vertical orientation when in the rest position. Such a vertical orientation, with the inlet to the sensing tube being above the free open end of the tube, insures that liquid or solid material passing through the sensing tube will be efficiently drained into the pressure vessel and not entrapped or accumulated in the sensing tube.

One application where such an orientation of the tubes is particularly important is when mass flow rates of solid-gas mixtures are to be made. For such applications, when the tubes are vertically oriented, the free end of the sensing tube must be constricted. Specifically, the inside diameter of the free end of the sensing tube must be of reduced diameter relative to that of the remainder of the tube so as to restrict the flow of the heavier material in the solid-gas mixture sufficiently to permit the heavier material to interact with the walls of the tube and therefore to permit its mass flow rate to participate in the generation of Coriolis forces. To compensate for the increased mass of the sensing tube, caused by the retained material, the free end of the complementary tube is capped off and a removable cap is provided at the fixed end of the complementary tube to permit filling of this tube with the solid material being measured. Thus, the moments of inertia for the sensing tube and the complementary tube can be matched.

In order to assure proper drainage from the pressure vessel of the heavier material in multi-phase fluids, an exit port is provided directly below the free end of the sensing tube. This exit port can advantageously be constructed in a cone-like shape with the expanded opening of the cone surrounding the open end of the sensing tube to facilitate further forwarding or collection of the heavier materials.

As with the instruments disclosed and claimed in U.S. Pat. No. 4,187,721 and co-pending patent application Ser. No. 280,297, the present invention provides a direct method, utilizing an essentially autonomous apparatus, for measuring the mass flow rate of fluids. Only insertion in the pipeline transporting the fluid to be measured is required. No special piping, pumping, reference standards or large floor space are required.

DETAILED DESCRIPTION OF THE INVENTION

Figure 1:
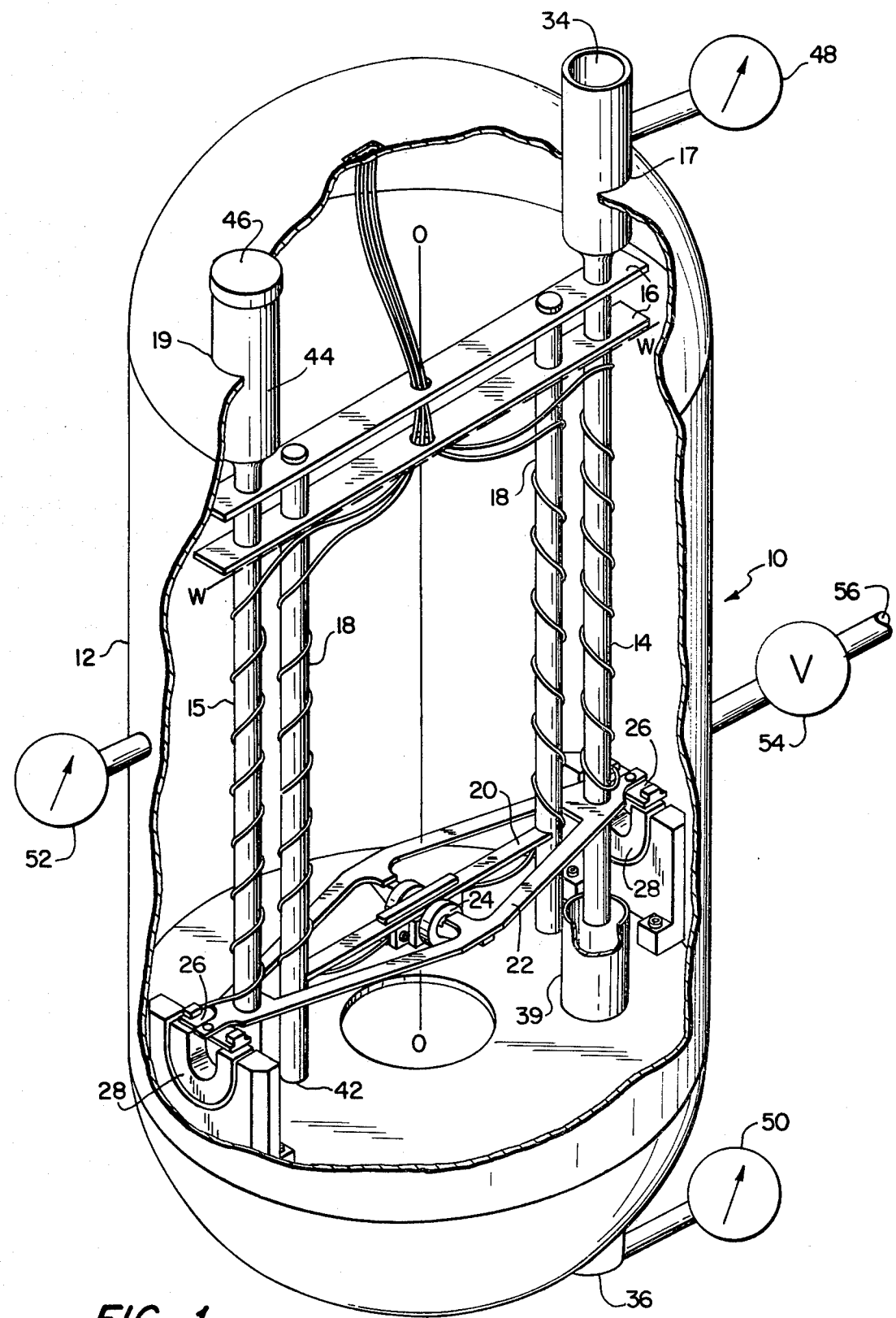
FIG. 1 is a perspective view of a mass flow rate meter according to the present invention.
Figure 2:
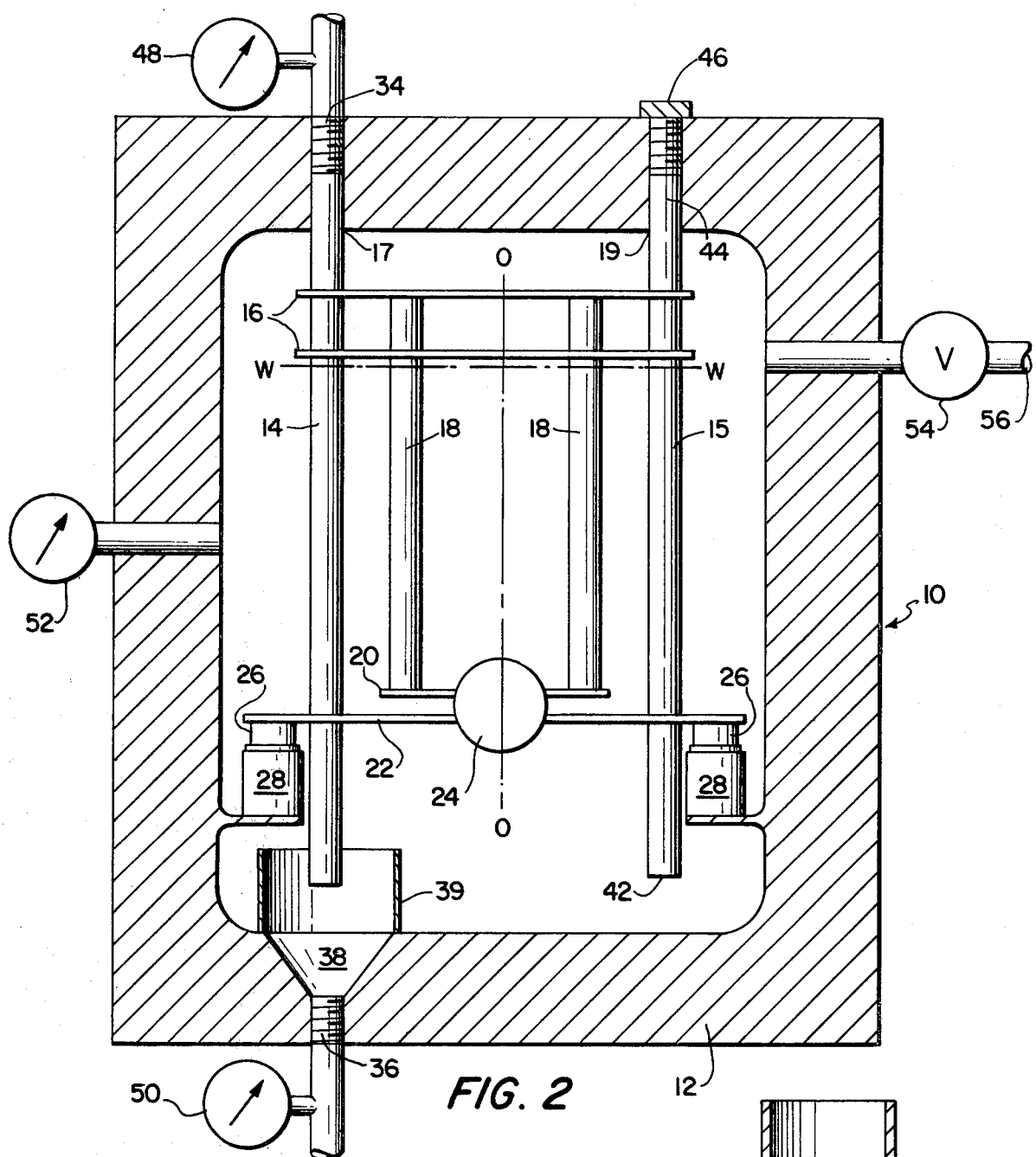
FIG. 2 is a plan view of a mass flow rate meter according to the present invention.

Referring now to the drawings, wherein corresponding components are designated by the same reference numerals throughout the various figures, a mass flow rate measuring device according to the invention is illustrated in FIG. 1 and FIG. 2 where it is generally designated by reference numeral 10. The measuring device 10 includes a sturdy pressure insensitive containment case 12 to which tubes 14 and 15 are fixedly attached, at 17 and 19 respectively so as to be parallel to each other and to have free ends. Tubes 14 and 15 are selected so as to have substantially the same moments of inertia and spring constants about the longitudinal axis of each tube and about a bending axis W—W, which is perpendicular to tubes 14 and 15 and located near the attachment of tubes 14 and 15 to the cross members 16. Additionally, attached to cross members 16 are tubes 18 which are in the same plane as tubes 14 and 15, and are so oriented that all tubes 14, 15 and 18 are essentially parallel. Cross members 16 are fixedly attached to tubes 14, 15, and 18 so that when the free ends of tubes 14, 15, and 18 are vibrated perpendicular to the common plane for all of these tubes, oscillation occurs about axis W—W. Attached to the free ends of tube 18 is cross member 20, and attached near the free ends of tubes 14 and 15 is cross member 22 which is a lightweight but rigid structure. Tubes 14 and 15, and cross member 22 are so selected and configured as to provide a compatible tuning fork tine for the mechanical configuration of tubes 18 and cross member 20. In order to sinusoidally drive this tuning fork configuration about axis W—W a drive mechanism 24 is mounted on cross members 20 and 22. Drive mechanism 24 can consist of such known means as a magnet and coil through which an oscillating electrical current is passed. Also attached to cross member 20 are sensing coils 26. These coils, 26, are so situated as to be in the volume of space surrounding permanent magnets 28 in which the magnetic flux field is essentially constant. Accordingly, the electrical signal outputs generated by coils 26 can be processed in the manner taught in co-pending patent application Ser. No. 280,297 to provide a measure of the time interval required for the second of either of the tubes 14 or 15 to pass through the mid-plane of oscillation after the first of such tubes, 14 or 15, has passed through the mid-plane.

Figure 3:
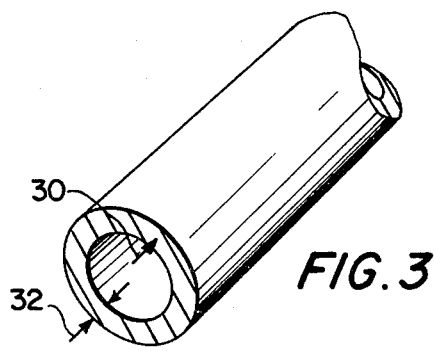
FIG. 3 is a perspective view of a section of a tube used in the present invention with various configuration parameters identified; and, FIG. 4 is a plan view of the free end of the sensing tube of the present invention as configured for measuring the mass flow rate of solid-gas mixtures.

The difference in time between the passage of tube 14 and that of tube 15 through the mid-plane is due to elastic deflection about a torsion axis O—O, which is located midway between and parallel to the tubes 14 and 15 and in the same plane as these tubes. This deflection is caused by the generated Coriolis forces. To insure that the magnitude of this deflection, and therefore of the time interval measurement, is dependent on the torsional resilience or wall thickness of the tubes 14 and 15 the resonance frequency about axis W—W is controlled through structural design of tubes 14, 15 and 18, and cross members 20 and 22 so that it is lower than the resonance frequency about axis O—O. Such dependency on the wall thickness of the tubing is mathematically expressed in the following relation:

$$K_t = \frac{2\pi E R_{avg}^3 t_0}{L} \quad \text{(Equation 1)}$$

where
  $K_t$ is the torsional spring constant of the tube,
  $R_{avg}$ is the average radius of the tube, as shown in FIG. 3 by reference numeral 30,
  $t_0$ is the wall thickness of the tubing as shown in FIG. 3 by reference numeral 32,
  L is the length of the tubing,
  E is the modulus of elasticity for the tube material.

Since the inner diameter of tube 14 is essentially determined by a requirement that it must be small enough to assure mechanical interaction between the fluid to be measured and the walls of tube 14, and by a requirement that it must be large enough to minimize the pressure drop caused by passing the fluid through tube 14, the only remaining variables for controlling the torsional spring constant of tube 14 are the wall thickness and length of the tube. However, as with the inner diameter of the tube the length of tube 14 can, if too large, cause unacceptable pressure drops in the fluid to be passed through tube 14. Thus, for present purposes the least constrained parameter available for reducing the torsional spring constant of tube 14 is the wall thickness of the tube, which should be as thin as feasible.

Tube 14 is affixed to case 12 at 17 in such a manner that the fluids to be measured can be flowed through entrance port 34, and from there directly into tube 14. Though tube 14 serves as an inlet conduit, tube 15 serves no similar function. For if tube 15 is utilized as an exit conduit for the fluid to be measured, it has been found that as the mass flow rate through the device is increased a decrease in the measured deflection about the axis O—O occurs. This decrease is apparently due to the fact that for a U-tube configuration the fluid flowing from the entrance conduit to the exit conduit through the yoke section possesses a component of linear momentum with respect to the plane occupied by the U-tube, whereas for a fluid diffusing through case 12 and entering tube 15 there is no similar component of linear momentum. Therefore, in the present invention tube 15 serves no similar sensory function to tube 14, but rather tube 15 is needed to provide a mechanical balance for tube 14, at a distance determined by the separation of tubes 14 and 15, in terms of spring constants and moments of inertia.

To enhance the understanding of how tube 14 functions as a sensory tube in relationship with tube 15, which functions as a complementary tube, the following mathematical relationships are provided:

As a finite mass moves through tube 14, while that tube is being oscillated, a Coriolis force will be generated. This force can be expressed in scalar terms as follows:

$$F_c = 2 M_f W V_f$$

where
  $F_c$ is the magnitude of the generated Coriolis force,
  $M_f$ is the mass of the finite segment moving through tube 14,
  W is the angular velocity of tube 14,
  $V_f$ is the velocity of the finite segment of mass moving through tube 14.

The direction of this force is perpendicular to the plane containing tubes 14 and 15. Therefore, a torque will be produced substantially about axis O—O. Since there is no outlet provided from the fixedly attached end of tube 15 there is effectively no mass movement through tube 15 and, therefore, only the Coriolis force generated in tube 14 produces a torque about axis O—O. A scalar relationship for this torque can be expressed as follows:

$$\Delta T = F_c r = 2 M_f W V_f r$$

where
  $\Delta T$ is the magnitude of the increment of torque produced by $F_c$,
  r is the perpendicular distance, or moment arm, from axis O—O to tube 14.

Now the mass flow rate passing through tube 14 can be expressed as follows:

$$\Delta Q = M_1 V_1$$

where
  $\Delta Q$ is the increment of mass flow rate resulting from the passage of a fluid through tube 14,
  $M_1$ is the mass per unit length of a fluid passing through tube 14,
  $V_1$ is the velocity of the fluid passing through tube 14, Substituting the above relationship for mass flow rate into the relationship for torque, and integrating over the length of tube 14, shows that the generated Coriolis torque for this mechanical configuration is a function of two variables—mass flow rate (Q) and angular velocity (W).

$$T = \int_0^L 2Wr \, \Delta Q \, dl = 2Wr \, QL$$

Opposing this torque generated by Coriolis forces is the torque produced by the spring constants of the tubes 14 and 15. Therefore, $$2WrQL = K\theta \qquad (5)$$

where

K is the summation of the spring constants associated with the tubes 14 and 15, $\theta$ is the angle of rotation about axis O—O caused by the applied torque.

Solving this last relationship for mass flow rate shows that the remaining variable terms are angular velocity (W) and angular deflection ($\theta$).

$$Q = K\theta/2WrL$$

Now, considering the mechanics of the two tubes as they respectively pass through the mid-plane of oscillation, the following relationship applies:

$$\Delta t \, V_t = 2r\theta$$

Where $\Delta t$ is the time interval required for the passage of the second of the two tubes 14 or 15 to pass through the mid-plane of oscillation after the passage of the first of those tubes through this mid-plane, $V_t$ is the linear velocity of tubes 14 and 15 at the location where $\Delta t$ is measured.

Since, $$V_t = LW$$

the angular deflection can be expressed as follows $$\theta = \frac{LW\Delta t}{2r}$$

Thus, $$Q = \frac{KLW\Delta t}{4Wr^2L} = \frac{K}{4r^2} \Delta t$$

At this point it is evident that the mass flow rate through tube 14 is a function of constants and the single variable $\Delta t$. Accordingly, it is clear that by making the time interval measurement, which establishes $\Delta t$, substantially at the mid-plane of oscillation, direct determination of the mass flow rate for the fluid flowing through tube 14 can be made without concern for measuring or accurately maintaining the angular velocity of the oscillating tubes 14 and 15.

To complete this mathematical summary of the mechanics associated with the invention, the functional representation of the spring constants associated with tubes 14 and 15 needs to be inserted in the last equation. Since displacements about both axes W—W and O—O are occurring it is the spring constants about these axes which must be considered. However, because the tubes are being resonantly oscillated about bending axis W—W and the $\Delta t$ measurement is being made when the deflection about the W—W axis is a minimum the torsional spring constants about tubes 14 and 15 are the terms of concern here. Therefore, inserting equation 1 in the last relationship for mass flow rate results in the following:

$$Q = \frac{2K_t}{4r^2} \Delta t = \frac{\pi E R_{avg}^3 t_0}{2r^2 L} \Delta t$$

This final relationship shows the direct dependency of the measurement of the mass flow rate of fluids, according to the present invention, on the tubular wall thickness ($t_0$) of tubes 14 and 15 and the time difference ($\Delta t$).

A fluid mass flow rate measuring device substantially as described above and as illustrated in FIG. 1 was built with tube 14 being fabricated of 6061T6 aluminum. This tube has a one inch inside diameter and a 0.005 inch wall thickness. The maximum pressure rating for the meter as built is 300 to 400 pounds per square inch, which is determined by the construction of case 12, and not the characteristics of tube 14. The range over which the meter as built is capable of reading mass flow rate is from 0.05 to 5 pounds per minute.

A vertical orientation for tubes 14 and 15 with the cross members 16 above the cross member 22 is preferred for the operation of the invention because this configuration facilitates drainage of liquids or solids contained in multi-phase fluids from the case 12 without fouling of critical mechanisms such as the sensor configurations (here preferably consisting of magnets 28 and coils 26), the vibration drive mechanism 24, or without interfering with the mechanical oscillation of tubes 14, 15, and 18. Such liquids or solids may either be intentionally or inadvertently present in the fluid to be measured. To further facilitate this drainage exit port 36 from case 12 is aligned below the free end of sensing tube 14, and the portion of this exit port, 38, on the interior of case 12 is of a general cone-like shape to assure collection for drainage of all liquid or solid substances injected into case 12 through tube 14. An additional cylindrical structure 39, to assure complete collection of measured material, encircles tube 14, without interfering with the oscillation of tube 14, and is attached at the outer edge of cone 38.

As has been explained above, the Coriolis forces are generated in such devices as 10 by accelerating the fluid passing through tube 14 in a direction perpendicular to that of the longitudinal axis of tube 14. For multi-phase fluids such as gases with interspersed solids, however, the density and velocity of the solids can be such that portions of the solids can pass through the sensing tube 14 without interacting with the oscillating walls of the tube.

Figure 4:
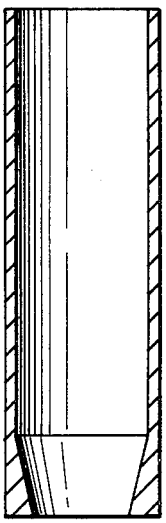

To assure that such solid material does experience acceleration to oscillatory movement, the free end of tube 14 may be constricted to reduce the inside diameter of the tube and thus temporarily trap the solid material in the tube. One configuration for so constricting the free end of tube 14 is shown in FIG. 4 at reference numeral 40. Such a configuration for the inside diameter of tube 14 will result in the collection of solid material in tube 14 when the mass flow rate of a multi-phase fluid is being measured. However, also associated with this collection in tube 14 will be an increase in the moment of inertia for the tube. To compensate for this increase in the moment of inertia of tube 14, tube 15 can similarly be partially filled with the solid material collected in tube 14; or some other material can be lodged in tube 15 to achieve the same effect on the moment of inertia of that tube. A configuration to achieve this purpose includes capping off the free end of tube 15 at 42 and providing an entrance port, 44, through case 12 to that tube. Also, associated with this configuration, to help, for example, prevent accidental filling of tube 15, a removable plug 46 can be used to seal off the entrance to tube 15.

A device substantially as described above for measuring the mass flow rates of multi-phase fluids such as gases with interspersed solids was built with tube 14 being fabricated of brass and having the free end constricted to reduce the inside diameter. For this device tube 14 has a 0.25 inch inside diameter above the constriction at the free end, a 0.005 inch wall thickness, and a six and a half inch extension from cross members 16. Both gravity fed sugar and powdered milk were separately used to test the operation of this device. When so tested at mass flow rates of one pound per minute the errors in measurements indicated by the device were only on the order of one percent.

For those applications where the solid material of a multi-phase gas-solid combination is to be measured, and the particle size and density of the solid material is such that collection in cylinder 39 is frustrated by the diffusion of the solid material above the upper rim of cylinder 39, so as to escape collection, the interior chamber of case 12 can be pressurized to facilitate efficient collection of the solid material in cylinder 39. In order to determine and maintain the proper pressurization of the interior chamber of case 12, gas pressure gauges 48, 50 and 52, which are of a type known in the art, may be connected to inlet port 34, exit port 36 and the interior chamber of case 12 respectively. The proper relationship for the pressures at the inlet port, exit port and interior chamber of case 12 is for (1) the highest pressure to be at the inlet port to assure efficient flow of the multi-phase fluid through tube 14, (2) the lowest pressure to be at the exit port 38 to assure efficient flow from the mass flow rate measuring device 10, and (3) the pressure in the interior chamber of case 12 to be between that at the inlet port 34 and the exit port 36 so that diffusion of the solid material from the cylinder 39 is retarded. This relationship between pressures is maintained by adjusting valve 54 to permit sufficient gas flow from a supply (not shown) connected to inlet 56. The gas used to maintain the desired pressure relationship is selected so as not to chemically interact with the constituents of the multi-phase fluid.

The above discussion and related illustrations of the present invention are directed primarily to preferred embodiments and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

What is claimed is:

1. An apparatus for measuring the mass flow rate of a fluid, comprising:
   (a) a resilient straight open sensing tube through which said fluid is passed, fixedly mounted at one end thereof, in cantilever fashion, to a support;
   (b) a resilient, straight, complementary tube, also fixedly mounted at one end thereof, in cantilever fashion, to said support and in parallel relationship to said sensing tube, which tubes are characterized by an axis of bending located near said fixedly attached ends and in the same plane as and perpendicular to said tubes, so that the moments of inertia of both tubes about said axis of bending are essentially equal and the spring constants of both tubes about said axis of bending are essentially equal, said tubes being further characterized by essentially equal moments of inertia and essentially equal spring constants about the longitudinal axes of each tube;
   (c) a rigid connecting means fixedly attached near the free ends of said tubes, whereby the resonant frequency of said tubes and rigid connecting means about said bending axis is different from the resonant frequency about a torsion axis located in the same plane as said tubes, perpendicular to said bending axis and essentially parallel to and midway between said tubes; and,
   (d) means attached to said rigid connecting means to sinusoidally drive said tubes about said bending axis at the resonant frequency;

whereby the flow of fluid passing through said oscillating sensing tube causes Coriolis force induced deflections of said rigid connecting means and said tubes about said torsion axis so that the mass flow rate of said fluid is measured as a direct function of the time interval between the deflection-caused passage through the midplane of oscillation of the second tube after the deflection-caused passage of the first tube through said midplane.

2. An apparatus as set forth in claim 1 in which the resonant frequency about said bending axis is lower than the resonant frequency about said torsion axis.

3. An apparatus as set forth in claim 1 in which two additional tubes are fixedly mounted to said support essentially parallel to and in the same plane as said sensing and complementary tubes, a connecting cross member is fixedly attached near the free ends of said additional tubes, said additional tubes and cross member are so configured and attached to said support that the combination can be sinusoidally driven as a tuning fork tine about said bending axis in opposition to the combination of said sensing tube, complementary tube and its rigid connecting means which then acts as the other tuning fork tine.

4. An apparatus as set forth in claim 1 in which said mounted sensing and complementary tubes, rigid connecting means, sinusoidal drive means, and means to sense said time interval are encased in a pressure vessel; which pressure vessel has an entrance passageway for fluids and acts to conduct said fluids through said sensing tube, and includes a separate exit port for said fluids located in the wall of said pressure vessel.

5. An apparatus as set forth in claim 4 in which said mounted sensing and complementary tubes are vertically oriented within said pressure vessel, with said rigid connecting means located below the fixedly mounted ends of said tubes to facilitate drainage of fluid from said sensing tube.

6. An apparatus as set forth in claim 5 in which said exit port is located below the open end of said sensing tube.

7. An apparatus as set forth in claim 6 in which said exit port incorporates an enlarged entrance section from said pressure vessel to enhance collection of substances passed through said sensing tube.

8. An apparatus as set forth in claim 7 in which a cylindrical structure extends from said enlarged entrance section to encircle the free end of said sensing tube so as to further enhance collection of substances passed through said sensing tube.

9. An apparatus as set forth in claim 8 in which:

(a) a pressure measuring gauge is connected to said entrance passageway to measure the pressure of said fluid entering said sensing tube;

(b) a pressure measuring gauge is connected to said exit port to measure the pressure of said fluid draining from said pressure vessel;

(c) a pressure measuring gauge is connected to said pressure vessel to measure the pressure within said pressure vessel; and, (d) a source of gas, which gas is inert to said fluid whose mass flow rate is being measured, is connected to said pressure vessel and the supply of said gas to the interior chamber of said pressure vessel is controlled by a valve;

whereby said valve can be adjusted so that the highest measured pressure is substantially that at said entrance passageway, the lowest measured pressure is substantially that at said exit port and an intermediate pressure is substantially that in the interior chamber of said pressure vessel.

10. An apparatus as set forth in claims 1 or 4 in which said complementary tube is closed at the free end.

11. An apparatus as set forth in claims 1 or 4 in which the inner diameter of said sensing tube at the open end of said tube is reduced to restrict flow of substances when measuring mass flow rates.

12. An apparatus as set forth in claim 11 in which said complementary tube is closed at the free end, and a capped passageway for filling said complementary tube with said substances which have had their flow restricted through said sensing tube is provided so as to increase the moment of inertia of said complementary tube to essentially that of said sensing tube when mass flow rates are being measured.

13. A method for measuring the mass flow rate of a fluid by generating Coriolis forces, comprising;

(a) flowing said fluid through a resilient open sensing tube, fixedly mounted at one end thereof, in cantilever fashion, to a support, and coupled by a rigid connecting means fixedly attached near the free end of said sensing tube to a resilient complementary tube also fixedly mounted at one end thereof, in cantilever fashion, to said support;

(b) sinusoidally driving the tubular assembly consisting of said complementary tube, filled sensing tube and rigid connecting means at the resonant frequency about an axis of bending located near said fixedly attached ends of said tubes and in the same plane as and perpendicular to said tubes, said resonant frequency about said bending axis being different from the resonant frequency of said tubular assembly about a torsion axis located in the same plane as said tubular assembly but perpendicular to said bending axis and essentially parallel to and midway between said tubes, whereby flowing fluid through said sensing tube and sinusoidally driving said tubular assembly causes deflection about said torsion axis; and, (c) measuring the time interval between the passage through the mid-plane of oscillation of the tube deflected forward by generated Coriolis forces and the tube retarded by generated Coriolis forces;

whereby the mass flow rate of said fluid is a direct function of the measured time interval.

14. A method for measuring the mass flow rate of a fluid as set forth in claim 13 in which said sensing tube, complementary tube and rigid connecting means are encased in a pressure vessel; which pressure vessel has an entrance passageway for fluids and acts to conduct said fluids through said sensing tube, and includes a separate exit port for said fluids located in the wall of said pressure vessel.

* * * * *

UNITED STATES PATENT AND TRADEMARK OFFICE
CERTIFICATE OF CORRECTION

PATENT NO. : 4,444,059
DATED : April 24, 1984
INVENTOR(S) : James E. Smith

It is certified that error appears in the above-identified patent and that said Letters Patent is hereby corrected as shown below:

Column 6, line 39, after " T", delete " - ", and insert " = " therefor.

Signed and Sealed this

Second Day of October 1984

[SEAL]

Attest:

GERALD J. MOSSINGHOFF

*Attesting Officer*  *Commissioner of Patents and Trademarks*